United States Patent
Kolawa et al.

(10) Patent No.: US 7,266,808 B2
(45) Date of Patent: Sep. 4, 2007

(54) METHOD AND SYSTEM FOR DYNAMICALLY INVOKING AND/OR CHECKING CONDITIONS OF A COMPUTER TEST PROGRAM

(75) Inventors: Adam Kolawa, Bradbury, CA (US); Roman Salvador, La Jolla, CA (US)

(73) Assignee: Parasoft Corporation, Monrovia, CA (US)

( * ) Notice: Subject to any disclaimer, the term of this patent is extended or adjusted under 35 U.S.C. 154(b) by 600 days.

(21) Appl. No.: 10/213,684

(22) Filed: Aug. 6, 2002

(65) Prior Publication Data

US 2003/0041288 A1 Feb. 27, 2003

Related U.S. Application Data

(60) Provisional application No. 60/311,473, filed on Aug. 10, 2001.

(51) Int. Cl.
*G06F 9/44* (2006.01)
(52) U.S. Cl. .................. 717/126; 717/114; 717/118; 717/130
(58) Field of Classification Search ............ 717/124, 717/126, 118, 114, 130; 714/38
See application file for complete search history.

(56) References Cited

U.S. PATENT DOCUMENTS

| | | | | |
|---|---|---|---|---|
| 5,761,408 A | * | 6/1998 | Kolawa et al. | 714/38 |
| 5,784,553 A | * | 7/1998 | Kolawa et al. | 714/38 |
| 6,249,882 B1 | * | 6/2001 | Testardi | 714/38 |
| 6,442,750 B1 | * | 8/2002 | Lopes et al. | 717/126 |
| 6,725,399 B1 | * | 4/2004 | Bowman | 714/38 |
| 6,898,784 B1 | * | 5/2005 | Kossatchev et al. | 717/126 |

OTHER PUBLICATIONS

Reto Kramer, "iContract—The Java Design by Contract Tool, 1998", IEEE, 13 pages.*
Parasoft, "A Major Development in Java Testing Achieved with the Introduction of Parasoft's Jcontract and Jtest 4.0", Apr. 18, 2001, Product Data Sheet of Parasoft, 2 pages.*
Computer Desktop Encyclopedia, "JavaServer Pages", 2000, 11 pages.*

(Continued)

*Primary Examiner*—Tuan Dam
*Assistant Examiner*—Thuy Dao
(74) *Attorney, Agent, or Firm*—Christie, Parker & Hale, LLP.

(57) ABSTRACT

A method and system for dynamically invoking and/or checking conditions of a computer test program. Test cases that verify class/component functionality are automatically created from the DbC contracts. When the classes/components that contain DbC contracts are added to the system, the invention automatically verifies whether the system uses them correctly. The information in the contract continents is used to generate more comprehensive and better quality test cases.

In one embodiment, a code's specification information is analyzed and a class with extra bytecodes that describe how the class is supposed to work and be used is generated. Next, the instrumented class is integrated into the system, and the system is run. The system is monitored as it runs and contract violations are automatically detected.

24 Claims, 6 Drawing Sheets

OTHER PUBLICATIONS

Final Report—Group 2, CS655 Programming Languages course, Spring 2000, University of Virginia, 25 pages. [Online] [Retrieved from] <http://www.cs.virginia.edu/~yel4j/cs655/project/final_report.html>.*

Parasoft, "Parasoft delivers Jtest 3.0, a complete error prevention and error detectin tool for Java development", Aug. 16, 1999 (2 pages). [Online] [Retrieved at] <www.parasoft.com/jsp/products/release.jsp?articleld=391&type=1999>.*

"Design by Contract and Unit Testing", Jim Weirich, published 2000 (11 pages). [Online] [Retrieved at] <www.gobosoft.com/eiffel/gobo/getest/see_also.html>.*

"Invitation to Eiffel", B. Meyer, Jul. 2001 (30 pages). Online retrieved at <archive.eiffel.com/doc/online/eiffel50/intro/language/invitation.pdf>.*

* cited by examiner

FIG. 2

Jcontract Monitor

File  Edit  Help

[ Reset ] [ Log ]

Runtime Progress
[2] Contract Violations

---

Runtime Progress

[2] Contract Violations
AssertException: |arg > 0|, in thread "main"
　|at Assert test 0 |Assert.java, line 10]
　|at Assert main 0 |Assert.java, line 21]
AssertException: |arg > 3|, in thread "main"
　|at Assert test 0 |Assert.java, line 11]
　|at Assert main 0 |Assert.java, line 21]

*FIG. 3*

Jcontract Monitor

File  Edit  Help

Reset  Log

Runtime Progress
[1] Contract Violations

Runtime Progress
- Instrumented classes loaded: 1
- @pre checks: 1
- @post checks: 0
- @invariant checks: 0
- @concurrency checks: 0
- @assert checks: 0

[1] Contract Violations
PreException: [month >= 1 && month <= 12], in thread "main"
| at Example.setMonth$dbc$pre 0 [Example.java, line 3]
| at Example.setMonth 0 [Example.java, line 4]
| at Example.main 0 [Example.java, line 13]

METHOD AND SYSTEM FOR DYNAMICALLY INVOKING AND/OR CHECKING CONDITIONS OF A COMPUTER TEST PROGRAM

CROSS-REFERENCE TO RELATED APPLICATION

This patent application claims the benefit of the filing date of U.S. Provisional Patent Application Ser. No. 60/311,473, filed Aug. 10, 2001 and entitled "METHOD AND SYSTEM FOR DYNAMICALLY INVOKING AND/OR CHECKING CONDITIONS OF A COMPUTER TEST PROGRAM", the entire contents of which are hereby expressly incorporated by reference.

FIELD OF THE INVENTION

The present invention relates to a method and system for testing computer programs. More specifically, the present invention is directed to a method and system for dynamically invoking and/or checking conditions of a computer test program.

BACKGROUND OF THE INVENTION

DESIGN BY CONTRACT™ (hereinafter, referred to as "DbC") is a beneficial software development practice that, until now, was cumbersome to actually incorporate into most development processes. DbC is a formal way of using comments to incorporate specification information into the code itself. DbC was designed to create a contract between a piece of code and its caller. This contract specifies what the callee expects and what the caller can expect. Basically, the code specification is expressed unambiguously using a formal language that describes the code's implicit contracts. These contracts specify such requirements as:

Conditions that the client must meet before a method is invoked.
Conditions that a method must meet after it executes.
Invariants that program objects must satisfy at all times.
Assertions that a method must satisfy at specific points of its execution.

DbC originated for Eiffel classes. Eiffel classes are components that cooperate through the use of the contract, which defines the obligations and benefits for each class. For an introduction to DbC, see "Object-Oriented Software Construction" by Bertrand Meyer Prentice Hall, ISBN 0-13-629155-4, the contents of which are hereby incorporated by reference. The contracts clearly document what each method requires and what it is required to do. This makes it possible to verify whether methods are used as expected and whether they deliver the results expected by other parts of the system.

Any piece of code in any language has implicit contracts attached to it. The simplest example of an implicit contract is a method for which a null is not supposed to be passed. If this contract is not met, a NullPointerException occurs. Another example is a component whose specification states that it only returns positive values. If it occasionally returns negative values and the consumer of this component is expecting the functionality described in the specification (only positive values returned), this contract violation could lead to a critical problem in the application. Applying DbC to a code has significant benefits including:

The code's assumptions are clearly documented (for example, an item should not be null). Design concepts are placed directly in the code itself.
The code's contracts can be checked for consistency because they are explicit.
The code is much easier to reuse.
The specification will not be lost.
When programmers see the specification while writing the code, they are more likely to implement the specification correctly.
When programmers see the specification while modifying code, they are much less likely to introduce errors.

However, conventional testing approaches have many disadvantages such as, black-box test cases must be created and updated each time the code's specification changes, and class/component misuse is difficult to be detected. Moreover, the class implementation can be cumbersome and there is no guarantee that the results will satisfy the post-conditions of the class client. Therefore, there is a need for a software tool to automatically check the implementation of contracts and to verify that a code functions in an expected way, particularly, in a target system.

SUMMARY OF THE INVENTION

In one embodiment, from the DbC contracts, the present invention automatically creates test cases that verify class/component functionality. Because this relieves a programmer from having to create black-box test cases, it saves time and resources. When the classes/components that contain DbC contracts are added to the system, the present invention automatically verifies whether the system uses them correctly. A misused class/component might appear to perform fine, but might actually spur subtle errors that can trigger system-wide problems.

On its own, DbC can be an effective way to prevent errors throughout the development process. DbC can be even more powerful when used with the present invention which understands and takes full advantage of the specification information recorded in the DbC contracts.

In one aspect, the invention is directed to a method for testing a computer code including DbC contracts, the method comprising: parsing the computer code; analyzing the DbC contracts included in the parsed computer code; generating test cases from the analyzed DbC contracts; executing the generated test cases; and verifying proper functioning of the DbC contracts. In another aspect, the invention is directed to a method for testing a class in a computer code including DbC contracts, comprising compiling the class; analyzing DbC information of the computer code; responsive to the analyzing DbC information, generating an instrumented class with extra bytecodes that describe how the class is expected to function; integrating the instrumented classes into a system under test; running the system with the instrumented class; monitoring the system while it is being run; and detecting any contract violation of the integrated class.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 2 is an exemplary monitor displaying the nature of each violation according to one embodiment of the present invention;

FIG. 3 is an exemplary UI screen indicating that contracts are being checked at runtime, according to one embodiment of the present invention;

DETAILED DESCRIPTION

Figure 1:
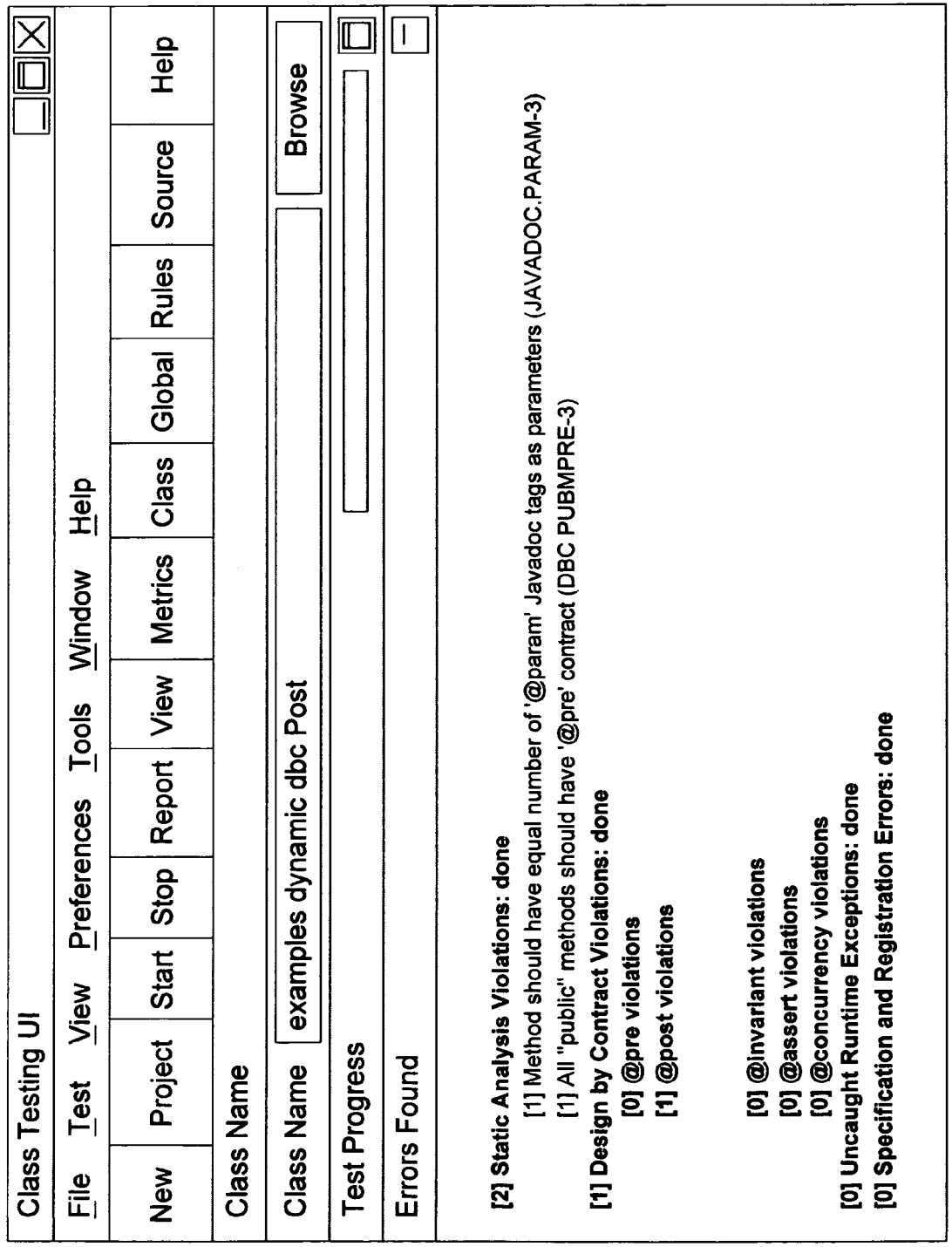
FIG. 1 is an exemplary user interface (UI) according to one embodiment of the present invention.

The inventions described in U.S. Pat. Nos. 5,761,408 (by Kolawa, et. al., issued on Jun. 2, 1998, "'408 invention" herein after), and 5,784,553 (by Kolawa, et. al., issued on Jul. 21, 1998, "'553 invention" herein after), the contents of which are herein fully incorporated by reference, help add specification information into computer code using DbC contracts This is beneficial because it ensures that the code and specification are always kept together.

In one embodiment, the '553 invention is a JAVA™ unit testing tool that tests any Java class or component; it automates black-box testing (functionality testing), white-box testing (construction testing), and regression testing, as well as, static analysis. The '553 invention is capable of working with the DbC language. When used with classes or components that contain DbC contracts, it automates black-box testing. The '553 invention reads the specification information built into a class, then automatically creates and executes test cases that check the functionality described in the specification. The invention also tailors its unit-level white-boxtest creation to the specifications contained in the contract.

In one embodiment, the present invention is a new Java development tool that checks DbC contracts at runtime; it can be run independently of the '553 invention, but the two tools may also be used complementary. After a programmer has used the '553 invention to thoroughly test a class or component at the unit level, the present invention is used to instrument and compile the DbC-commented code to generate for example, ".class" files. Once a class or component is instrumented, the present invention automatically checks whether its contracts are violated at runtime. The present invention is particularly useful for determining whether an application misuses specific classes or components. The present invention can also leverage DbC information and improve the software development process.

Using the present invention includes additional substantial benefits such as:

Black-box test cases are created automatically.

Black-box test cases are automatically updated as the code's specification changes.

Class/component misuse is automatically detected.

The class implementation can assume that input arguments satisfy the preconditions, so the implementation can be simpler and more efficient.

The class client is guaranteed that the results will satisfy the post-conditions.

It is not difficult to use the DbC language in Java development. There have been some efforts to make DbC available in Java. Most of these efforts involve using Java-doc comments to specify the contract's conditions. A simple example is:

```
public class ShoppingCart
{
    /**
     * @pre item ! = null
     * @post $result > 0
     */
    public float add (Item item) {
        _items.addElement (item);
        _totalCost += item.getPrice ();
        return _totalCost;
    }
        private float_totalCost = 0;
        private Vector _items = new Vector ();
}
```

The contract contains the following conditions:

1. A precondition (@pre item !=null) which specifies that the item to be added to the shopping cart shouldn't be null.
2. A post-condition (@post $result>0) which specifies that the value returned by the method is always greater than 0.

Preconditions and post-conditions can be thought of as sophisticated assertions. Preconditions are conditions that a method's client needs to satisfy before the method can execute and a violation of a precondition indicates a problem with the client (the client is misusing the method). Post-conditions are conditions that the implementer of the class guarantees will always be satisfied after a method completes and a post-condition violation indicates a problem within the method.

Furthermore, DbC comments allow to specify the code contract explicitly. The following is an example of code with DbC comments:

```
class Example
{
    /** @pre arg >= 0 && arg < 100 */
    /** @post $result != 27 */
    int method (int arg) {
        return arg + 3;
    }
}
```

The @pre contract specifies what inputs the method accepts. The @post contract guaranties what the output is. The contracts in the above example indicate that the method should only be passing arg values between 0 and 99 and that it will never return a value equal to 27. Note that the above method violates its @post contract and will return 27 for arg equal to 24. This is an error in the method implementation, however, the present invention is capable of detecting it.

The invention uses the information in the DbC comments to generate more comprehensive and better quality test cases. For example, for the above example, the present invention uses the info in the @pre contract to generate input values for arg<0, arg between 0 and 99 and arg>100. The invention also uses the info in the (post contract to generate an input value for arg==24. In other words, the invention generates inputs to cover the branches in the contracts.

In order to take advantage of the comments one needs instrumented class files that invoke the @pre condition before the method is called and invoke the @post condition when the method returns. In one embodiment, the present invention generates instrumented .class files that check the contracts in the code. Basically, .class_i, (the instrumented class) file is generated from the original .java source.

Figure 5:
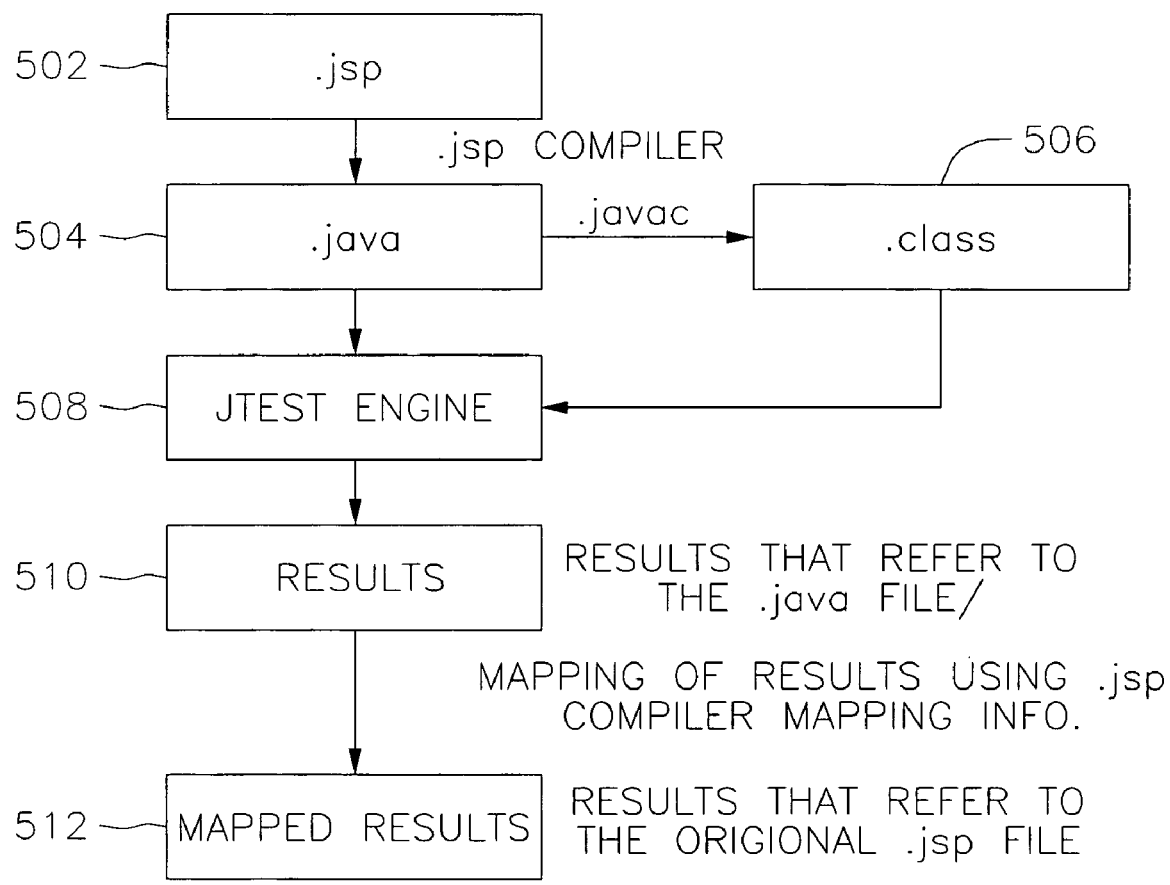
FIG. 5 is an exemplary flow graph for test case generation from a JAVA™ source code, according to one embodiment of the present invention.

FIG. 5 is an exemplary flow graph for test case generation from a java source code. An original .java file 504 is compiled into an instrumented .class_i file 506 typically, by using a DbC-java compiler. In addition to test case generation from a .java file, the invention is capable of generating test cases from a java server pages (.jsp) file 502. The .java (or the .jsp) file along with the .class_i file are fed to a test engine 508. Test and verification results related to the .java file are then obtained by Result 510. In case of a .jsp file, the results are mapped using .jsp compiler mapping results, as shown in block 512. Using the mapping information from the jsp compiler the results are mapped back to the .jsp file, so the error messages, etc. refer to the original .jsp file. From the user point of view, the intermediate java and .class files are not visible. The user just sees a system that tests .jsp files.

Figure 6:
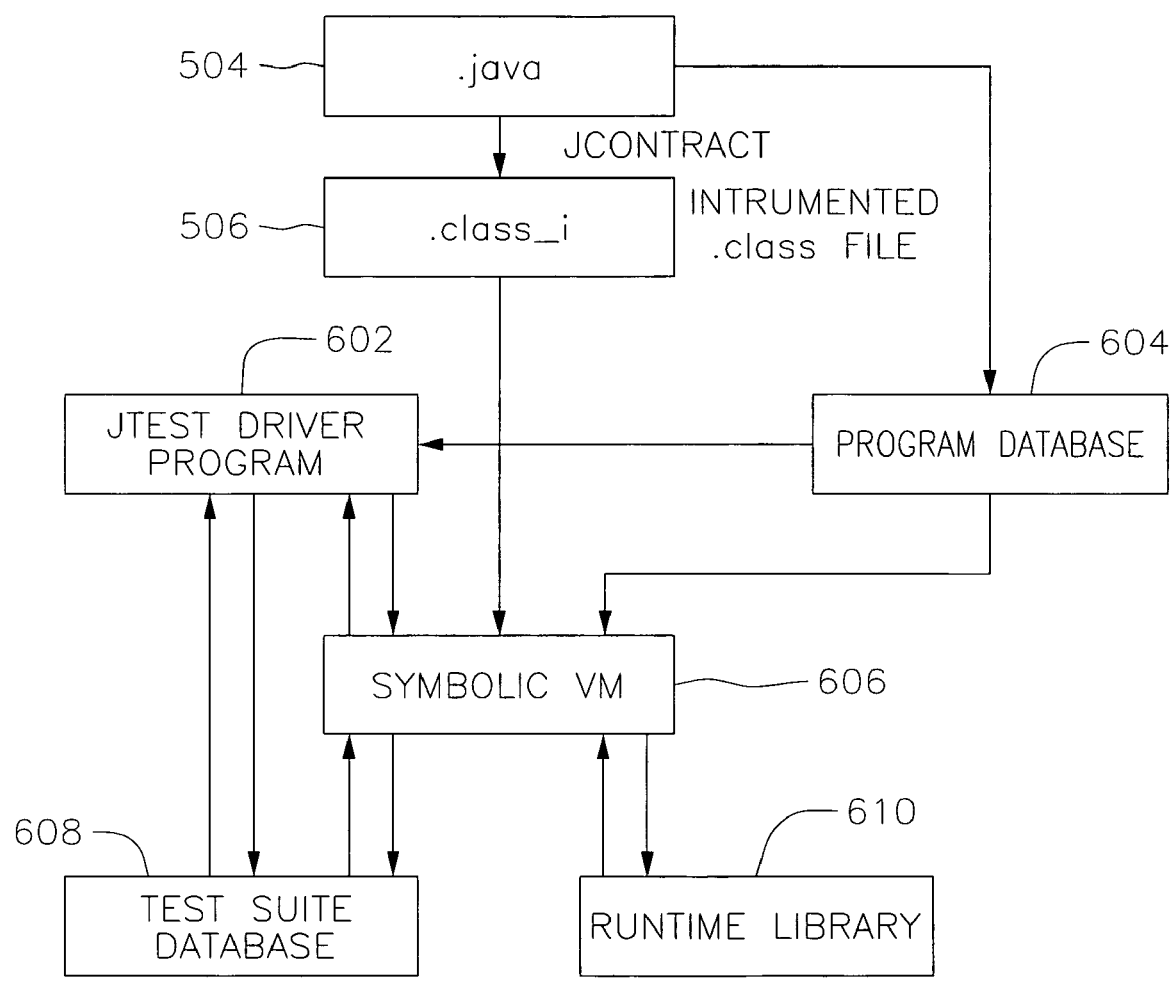
FIG. 6 is an exemplary flow graph for the test engine of FIG. 5, according to one embodiment of the present invention.

FIG. 6 is an exemplary flow graph for the test engine 508 of FIG. 5. Information about the contracts in the code (.java or .jsp file, and the .class_i file) is added to the program database 604. A driver program 602 invokes a symbolic virtual machine (VM) 606 to execute the program. The symbolic VM reads the instrumented .class_i file and any other .class files needed and executes the program symbolically. While executing the program, symbolic VM 602 decides what input to use on the fly. Basically when arriving at a branch decision point in the program, symbolic VM looks in a test suite database 608 to find out what possible branch will generate a test case not in the test suite database, then it tries to find the appropriate input so that the desired branch is taken. At the end of the program execution, the symbolic VM writes the selected input into the test suite database 608. The selected input contains the values for the arguments to the method being tested. The symbolic VM has the capability of changing on-the-fly the inputs it is using to run the test cases. The symbolic VM uses the information in the contracts that exist in the instrumented .class file. The symbolic VM generates inputs to cover the different conditions that the DbC contracts specify. By generating inputs that cover the conditions in the @pre contract, only test cases that are valid are generated. By trying to generate inputs that cover the conditions in the @post, @invariant, @assert and in @pre conditions of called methods, the symbolic VM checks that the method follows the specification. For example, if the symbolic VM can find an input that makes a @post fail, it means that the method doesn't follow its DbC specification.

At this point the driver program invokes the symbolic VM again. This process is repeated until the symbolic VM cannot find any more inputs. The runtime library 610 contains support code for the automatic stubs, the symbolic execution and the additional instrumented code generated by the invention. Stubs are basically replacements for references to methods external to the class. For example, with stubs one can specify that when the method "stream.readInt ( )" is invoked, the value 3 should be returned instead of invoking the actual "readInt ( )" method.

The main reasons to use stubs are:
1. To isolate a class and test the class independently of other classes it uses. Basically, the environment under which a class is being tested is then under full control and the results of the test are independent of possible changes/errors introduced in the other classes.
2. To test a class before the implementation other classes used by that class.

In one embodiment, the invention provides different kinds of stubs to provide total control for both automatic and user defined test cases, such as:
  a) Automatic Stubs: stubs generated automatically by the invention.
  b) User Defined Stubs: stubs specified by the user.

While running the automatic test cases, the invention can automatically generate stubs for certain external resources referenced (e.g., IO, database, etc.). This allows the invention to perform white-box testing of the class with respect to inputs from external resources. For example, when accessing files or databases, the invention automatically generates input coming from those resources. The invention assumes that a reference to an external resource can return any input compatible with its return type. The invention analyzes the code and generates return values that increase the coverage or that make exceptions to be thrown in the code.

Automatic Stubs also enhance the Automatic Regression Testing capabilities of the invention. If the output from the program changes given the same inputs from the external resources the invention will then report a Regression Error.

Automatic stubs allow to test the code with respect to input from external resources. For example, given the following code:

```
class Example
{
    public int addInput (DataInputStream in)
        throws IOException
    {
        return in.readInt () + in.readInt ();
    }
}
```

In one embodiment, the tool of the present invention is capable of testing this code by providing automatic stubs. When the external call "in.readInt ( )" is seen, the symbolic VM does not try to make that call and instead, provides an automatic return value (automatic stub).

For example, the present invention generates the following test cases for the above example:

```
Input = {
    Example THIS = new Example ();
    int RETVAL = THIS.addInput (null);
}
Outcomes = {
    Exception: java.lang.NullPointerException
        at Example.addInput (null) [Example.java, line 8]
        - State: Incorrect: Is an Uncaught Runtime Exception.
```

-continued

```
}
------------------------------------
Input = {
    Example THIS = new Example ();
    THIS.addInput (lava.io.DataInputStream);
        Auto-Stub: java.io.DataInputStream.readInt: throws
java.to.IOException
            at Example.addInput (lava.io.DataInputStream)
[Example.java, line 8]
}
Outcomes = {
    Exception: java.io.IOException
        at Example.addInput (java.io.DataInputStream) [Example.java.line
8]
        - State: Unknown.
}
Input = {
    Example THIS = new Example ();
    THIS.addInput (java.io.DataInputStream);
        Auto-Stub: java.io.DataInputStream.readInt: throws
java.io.EOFException
            at Example.addInput (java.io.DataInputStream)
[Example.java, line 8]
}
Outcomes = {
    Exception: java.io.EOFException
        at Example.addInput (lava.io.DataInputStream) [Example.java, line
8]
        - State: Unknown.
}
Input = {
    Example THIS = new Example ();
    THIS.addInput (java.io.DataInputStream);
        Auto-Stub: java.io.DataInput Stream.readInt: returns 0
            at Example.addInput (java.io.DataInputStream)
[Example.java, line 8]
        Auto-Stub: java.io.DataInputStream.readInt: returns 0
            at Example.addInput (lava.io.DataInputStream)
[Example.java, line 8]
}
Outcomes = {
    Exception: <NO-Exception>
        - State: Unknown.
    RETVAL = 0
        - State: Unknown.
}
```

As a result, the "Auto-Stub" lines are automatically generated for the above test cases ( ) by the present invention.

As described above, the symbolic VM 606 is also capable of automatic regression testing. To perform automatic regression testing, the invention automatically calculates outcomes for the test cases generated. See for example, the outcomes in the test cases for the "Automatic Stubs" example, above. When the invention tests this class again, it checks if the outcomes stay the same, if not, the invention reports a Regression Error. Therefore, in one embodiment, in addition to generating test cases, the present invention automatically calculates outcomes for the test cases, keeps them in the test suite database, and checks if they changed whenever the class is tested again.

Other exemplary contract elements that an embodiment of the present invention understands and uses include:

@invariant. Conditions (similar to post-conditions) that apply to all of the methods in the class. An invariant violation indicates a problem with the class's implementation.

@assert. Boolean expressions about the state of the software. Each @assert expression is executed at the point in the program where the @assert tag is located. An assertion violation indicates a problem within the method.

@exception. Tags used to indicate that the code is expected to throw a certain exception.

@concurrency. Tags used to specify the concurrency mode in which the method can be called.

@verbose. Tags that allow adding verbose statements to the code.

In one embodiment, the present invention is used complementary to the '408 and '553 inventions. Once all of the problems that the '408 and '553 inventions have uncovered (functionality problems, construction problems, and static analysis violations) are repaired, the class is ready to be integrated into the system. At that point, the present invention is used to monitor whether the class's contract requirements are met at runtime. Therefore, in one embodiment, the present invention is used to check a class or component's contracts at runtime, after other tools as the '408 and '553 inventions have been used to verify that the class or component is solid and correct. However, the respective tools can be used independently of one another. FIG. 1 shows an exemplary user interface (UI) for this process. The name of the class to be tested is entered in the Class Name section and the errors are reported in the Error Found section.

When a class or component has been tested and is ready to be integrated into the system, the class is recompiled with the tool of the present invention by simply calling a dbc_javac compiler. For example, to instrument and compile "Example.java," the following command is entered:

dbc_javac Example.java

The present invention then analyzes the code's specification information and generates a class with extra bytecodes that describe how the class is supposed to work and be used. Next, the instrumented class (class with the extra bytecodes) is integrated into the system, and the system is run. The present invention watches the system as it runs and automatically detects contract violations. For example, if a component's DbC specification specifics that a particular method required positive integer inputs, the present invention would report a violation if the system passed that method any negative inputs. By default, the detected contract violations are reported in a monitor. This monitor displays the nature of each violation as well as stack trace information. An exemplary monitor screen is shown in FIG. 2. As depicted, this screen includes a Runtime Progress portion and a Contract Violation portion.

The present invention's degree of program interference is customizable. By default, the present invention uses a non-intrusive runtime handler that reports violations found, but does not alter program execution. Different runtime handlers can be selected. For example, a runtime handler that throws an exception (an exception is an event that tells the executing program that something abnormal happened) when a violation occurs, a runtime handler that logs violations in a file, or a customized runtime handler that is specially tailored to a user's needs can be selected.

The present invention also adapts to users' needs by letting them select which contract conditions they want the tool to instrument. This way, the users can optimize program performance by having the present invention focus on the conditions that are most important at the current stage of the development process. For example, after a well-tested class is integrated into an application, a user might only want to instrument and check preconditions that verify whether the application uses the class correctly.

Exemplary coding standards that an embodiment of the present invention applies include:
All "protected" classes should have an @invariant contract.
All "protected" methods should have an @post contract.
All "protected" methods should have an @pre contract.
All "public" classes should have an @invariant contract.
All "public" methods should have an @post contract.
All "public" methods should have an @pre contract.
All package-private classes should have an @invariant contract.
All package-private methods should have an @post Javadoc tag.
All package-private methods should have an @pre Javadoc tag.
All "private" classes should have an @invariant contract.
All "private" methods should have an @post contract.
All "private" methods should have an @pre contract.

The present invention also optimizes unit-level white-box (construction) testing with DbC. The term unit testing is used here to describe testing the smallest possible unit of an application. For example, in terms of Java, unit testing involves testing a class as soon as it is compiled. Users can use DbC comments to filter out error messages that are not relevant to the class under test. If an expected exception in the code is documented using the @exception tag, the invention suppresses any occurrence of that particular exception. If a permissible range for valid method inputs using is documented the @pre tag, the invention suppresses any errors found for inputs that do not satisfy those preconditions.

In one embodiment of the present invention, white-box testing can be customized. Two DbC tags may be used to customize the invention to automatically suppress uncaught runtime exceptions that are not expected to occur. To have the invention suppress errors for inputs that are not expected to occur, the @pre tag is used to specify what inputs are permissible. To have the invention suppress expected exceptions, the @exception tag IS used to specify what exceptions the invention need to ignore.

However, system-level testing can uncover different types of errors than unit testing. System-level testing can expose instances where the system misuses a class or component as well as instances where complex system interactions cause problems that were not apparent at the unit-level. After the user is confident that the class or component works correctly, the user recompiles the class or component with the tool's dbc_javac compiler, then integrates it into the system where it will be used. Next, the user runs the system using a normal test suite. For example, if the instrumented component is part of a Web application, the user would want to test all facets of the application including its interactions with databases and other business logic components to ensure that a wide range of possible interactions and uses are tested. FIG. 3 shows an exemplary UI screen indicating that contracts are being checked at runtime, according to one embodiment of the present invention.

At runtime, the present invention preferably checks two major things:
Whether the rest of the system use the instrumented class correctly. (whether other parts of the system pass the instrumented class inputs that do not violate the requirements specified in the preconditions.)
Whether the instrumented class's interactions with the rest of the system lead to functionality problems that could not be exposed at the unit level. (Whether a certain chain of reactions cause an assertion to fail, or a method to return a value that violates its post-condition.)

Figure 4:
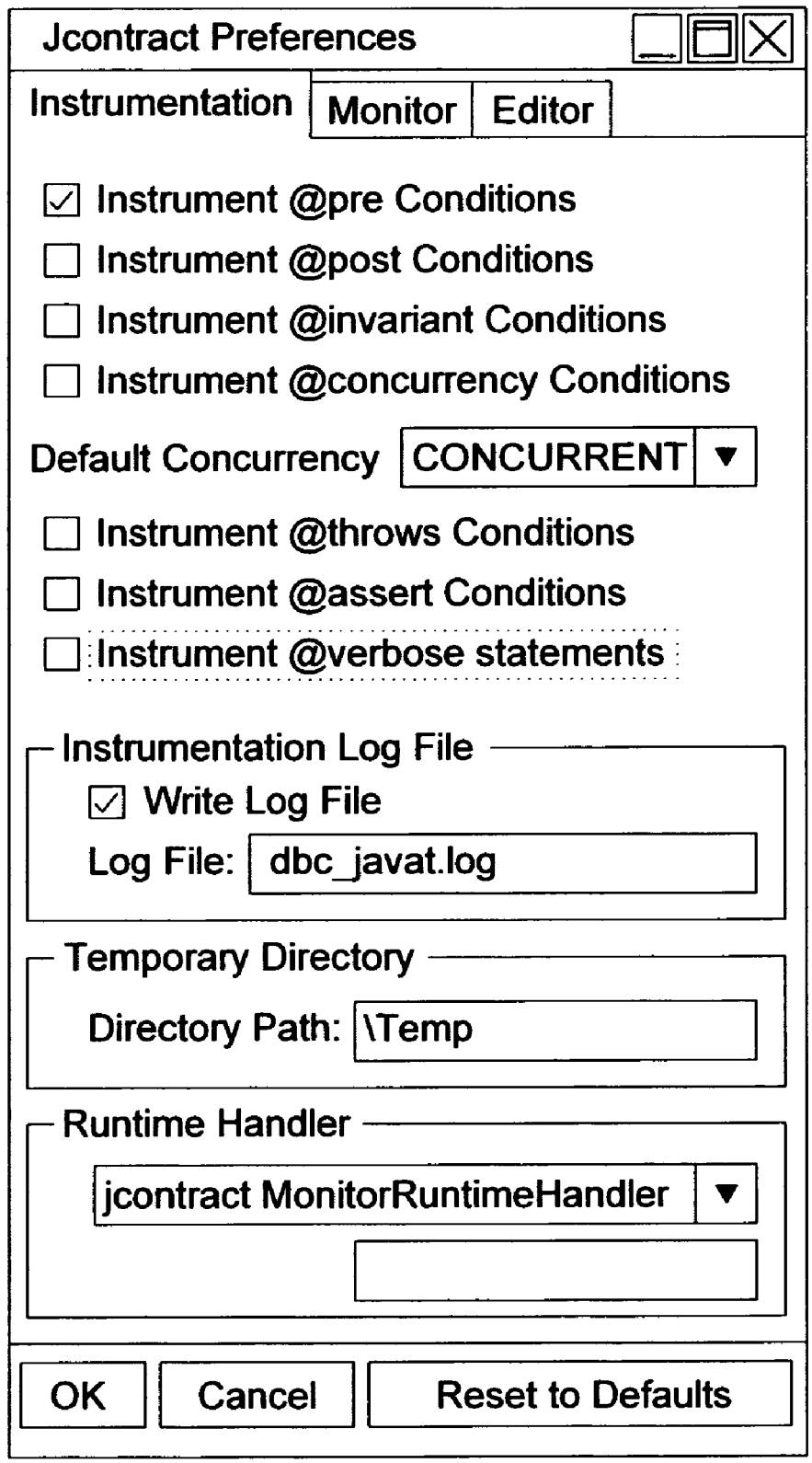
FIG. 4 is an exemplary UI screen for customizing the preferences, according to one embodiment of the present invention.

If performance speed is an issue, the tool of the present invention can easily be configured so that it only instruments the contract types that a user is most concerned with. This feature makes it easy to get the precise checking that is needed without sacrificing performance. FIG. 4 shows an exemplary UI screen for customizing the preferences, according to one embodiment of the present invention.

For example, say that a user have thoroughly tested a performance-critical class at the unit level and is fairly certain that it functions correctly. The user wants to determine if it is used correctly within the system, but the user does not want the performance hit that might arise from checking all of the class's post-condition and assertion contracts. A good solution would be to have the present invention instrument only the preconditions when it recompiled the class; this way, the user would gain the precondition checking without a significant impact on that critical class's performance.

In one embodiment, the present invention is capable of testing java server pages (.jsp). Java server pages are a mixture of Html/XML and java code. The server that runs the web site translates those pages into class files which are run whenever somebody accesses that page. The present invention is capable of testing the .jsp pages by using the exemplary steps shown in FIG. 6. The .jsp file is translated into a .java file using a publicly available jsp compiler. The .java file is translated into a .class file using javac. At this point, the .class and .java files are fed to tool and the tool generates results (i.e. error messages) that refer to the .java file.

In one embodiment, the present invention is capable of performing black-box testing. Black-box (functionality) testing checks a class's functionality by determining whether or not the class's public interface performs according to specification. This type of testing is performed without paying attention to implementation details. If a class contains DbC format specification information, the invention automates the black-box testing process. If not, the invention makes the black-box testing process significantly easier and more effective.

The invention reads specification information built into the class with the DbC language, then automatically develops test cases based on this specification. In one embodiment, the invention designs its black-box test cases as follows:

If the code has postconditions, the invention creates test cases that verify whether the code satisfies those conditions.

If the code has assertions, the invention creates test cases that try to make the assertions fail.

If the code has invariant conditions (conditions that apply to all of a class's methods), the invention creates test cases that verify whether the code satisfies those conditions.

If the code has preconditions, the invention tries to find inputs that force all of the paths in the preconditions.

If the method under test calls other methods that have specified preconditions, the invention determines if the method under test can pass non-permissible values to the other methods.

For example, the following code contains a post-condition that describes part of the method's specification:

```
package examples.dynamic.dbc;
    class Post
    {
        /** @post $result == a + b */
        public static int add (int a, int b)
        {
            return a - b; //BUG: note it should be '+' not '-'
        }
    }
```

According to the specification, the method should return a+b. However, it actually returns a−b. When this class is tested, in one embodiment, the present invention instruments the comments, compiles the class, analyzes the specification information, then creates and executes test cases that check whether its functionality is implemented correctly.

In this case, the test results reveal that the functionality is not implemented correctly. A display window displays selected test cases that were created automatically. Preferably, only the test cases that do something new (e.g., increase coverage, throw a new exception, etc.) are shown in this display window. For instance, a Test Case 1 may show that the method functions as specified when the value of 0 is assigned to both a and b. However, a Test Case 2 may uncover values for a and b that violate the method's post-condition contract. When the value of 7 is assigned to both a and b, the method's functionality flaw (it subtracts b from a rather than add the two values) is exposed.

For a second example, a class that has a simple assertion is considered.

```
package examples.dynamic.dbc;
public class Assert
{
    public static int calculate (int size 1, int size2)
    {
        int tmp = size1 * size2 - 10;
        /** @assert tmp > 0 */
            return tmp * 2;
        }
}
```

In one embodiment, when the present invention tests this class, it tries to create test cases that make the assertion fail. Once again, the invention automatically creates test cases that test the specified functionality and expose functionality problems. After the code is repaired, these same test cases can be replayed to determine whether or not the modifications actually repaired the problem.

The invention also helps create black-box test cases if DbC is not used The invention's automatically-generated set of test cases can be used as the foundation for a black-box test suite, then extended by adding one's own test cases. Test cases can be added in a variety of ways. For example, test cases can be introduced by adding:

Method inputs directly to a tree node representing each method argument.

Constants and methods to global or local repositories, then adding them to any method argument.

JUnit-format Test Classes for test cases that are complex or difficult to be added as method inputs.

If a class references external resources, one's own stubs can be entered or the invention can be made to call the actual external method. When the test is run, the invention uses any available stubs, automatically executes the inputs, and displays the outcomes for those inputs in a simple tree representation. The user can then view the outcomes and verify them with the click of a button. The invention automatically notifies the user when specification and regression testing errors occur on subsequent tests of this class.

The invention performs black-box testing, along with all other appropriate types of testing, each time that a class or set of are tested. The invention automatically creates and executes test cases that verify code functionality when specification information is incorporated into the code using DbC language. The invention also checks functionality using any test cases the user has added as well as any automatically-generated test cases whose outputs have been validated.

To perform black-box testing:
1. Open the appropriate UI for the test. The Class Testing UI is used to test a single class; the Project Testing UI is used to test a set of classes.

The Class Testing UI opens by default when the invention is launched.

The Project Testing UI can be opened by clicking the Class Testing UI's Project button.
2. If a class or set of classes is already loaded into the UI, click the New button to clear the previous test.

3. Use the Browse button to indicate what class or set of classes to be tested.
4. (Optional) Add test cases by adding method inputs and/or Test Classes.
5. Test the class or project by clicking the Start button.
   If you only want to perform dynamic analysis, right-click the Start button, then choose Dynamic Analysis from the shortcut menu.
   If you only want to execute automatically-generated test cases, right-click the Start button, then choose Dynamic Analysis>Automatic from the shortcut menu.
   If you only want to execute user-defined test cases, right-click the Start button, then choose Dynamic Analysis>User Defined from the shortcut menu.
   The invention will then run all requested tests.

If the classes under test contain DbC specification information, any functionality problems found will be reported in the DESIGN BY CONTRACT™ Violations branch of the Errors Found Panel (if a single class was tested) or the Results Panel (if a project was tested). If user-defined test cases were added, the user should evaluate the outcomes for all tested classes and specify the correct output values for test cases that failed.

To evaluate test case outcomes for a class:
1. Review the class's test case outcomes in the View Test Cases windowView Test Cases window.
2. To open this window from the Class Testing UI, click the View Test Cases button.
3. To open this window from the Project Testing UI's Results panel, right-click the [Class Name] node, then choose View Test Cases from the shortcut menu.
   In the View Test Cases window, expand the test case tree so that the inputs and outcomes for the test cases you are evaluating are visible.
   Indicate whether or not the outcome for each test case is correct by right-clicking the appropriate outcome, then choosing the appropriate option.
   Choose Mark as Correct if the listed outcome is the expected outcome.
   Choose Mark as Incorrect if the listed outcome is not the expected outcome.
   Choose Mark as Unknown if you don't know how the listed outcome compares to the expected outcome.
   Choose Mark as Ignore if you want the invention to ignore the listed outcome.
   To choose the same option for all of a test case's outcomes, right-click the test case's Outcomes leaf, then choose the appropriate Set All to . . . command from the shortcut menu.
4. If any outcome was incorrect, enter the correct value by:
   a. Opening the Class Test Parameters window.
   b. Opening that test case's branch in Dynamic Analysis>Test Case Evaluation>Specification and Regression Testing.
   c. Right-clicking the outcome, choosing Edit from the shortcut menu, then entering the correct value in the text field that opens.

Now, every time the invention is run on that class, it will check whether or not the correct outcomes are produced. Any problems found using these test cases will be reported in the Specification and Regression Errors branch of the Errors Found Panel (if a single class was tested) or the Results Panel (if a project was tested).

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the appended claims. For example, although the present invention is describes in conjunction with Java and Java Server Pages, any other language that uses DbC can be tested using the present invention.

What is claimed is:

1. A method for testing a computer code including software contracts, the method comprising:
   parsing the computer code;
   analyzing the contracts included in the parsed computer code;
   automatically combining information from the parsed code and information from analyzed contracts to create relevant inputs for unit test cases to cover different conditions that the contracts specify;
   executing the unit test cases with the generated relevant inputs;
   verifying proper functioning of the different conditions in the contracts; and
   suppressing expected errors based on the analyzed contract information.

2. The method of claim 1, wherein the computer code comprises JAVA programming language.

3. The method of claim 1, wherein the computer code comprises Java Server Pages programming language.

4. The method of claim 1, further comprising reporting any violation in functioning of the contracts on a display monitor.

5. The method of claim 1, further comprising altering the program execution if any violation in functioning of the contracts is found.

6. The method of claim 1, wherein the computer code includes a plurality of classes and components and the verifying step comprises verifying the proper functioning of the plurality of classes and components, further comprising:
   compiling the verified plurality of classes and components;
   analyzing contract information of the computer code;
   responsive to the analyzing contract information, generating a second plurality of classes each with extra bytecodes that describe how the respective class is expected to function;
   integrating the second plurality of classes with a system under test;
   running the system under test;
   monitoring the system under test while it is being run; and
   detecting any contract violation of the integrated plurality of classes.

7. The method of claim 1, wherein the step of generating unit test cases comprising generating automatic stubs.

8. The method of claim 1, further comprising regression testing of the computer code.

9. The method of claim 8, wherein the regression testing step comprises:
   calculating first outcomes for the generated unit test cases;
   re-testing the generated unit test cases;
   calculating second outcomes for the re-tested unit test cases;
   checking the second outcomes against the first outcomes; and
   reporting a regression error if the second outcomes do not match the first outcomes.

10. The method of claim 1, further comprising storing the generated test cases for future use.

11. The method of claim 1, further comprising a graphical user interface (GUI) for accepting user's input.

12. The method of claim 11, further comprising reporting any violation in functioning of the contracts in the GUI.

13. The method of claim 11, wherein the reporting step comprises reporting only the portion of the computer code that violates proper functioning of the contracts.

14. The method of claim 1, wherein the computer code is source code.

15. A method for testing a class in a computer code including software contracts, the method comprising:
   analyzing contract information of the computer code;
   based on the analyzed contract information, automatically generating stubs to cover permissible branches of the contracts included in the computer code;
   instrumenting the class with the generated stubs;
   integrating the instrumented class with the computer code;
   running the computer code with the instrumented class;
   monitoring the computer code while it is being run;
   detecting any contract violation of the integrated class; and
   suppressing expected errors based on the analyzed contract information.

16. The method of claim 15, wherein the computer code comprises JAVA programming language.

17. The method of claim 15, wherein the computer code comprises Java Server Pages programming language.

18. The method of claim 15, further comprising reporting any violation in functioning of the class.

19. The method of claim 15, further comprising altering the computer code execution if any violation in functioning of the class is found.

20. The method of claim 15, wherein the computer code is source code.

21. A computer readable storage medium having stored thereon a set of instructions including instructions for testing a computer code including software contracts, the instructions, when executed by a computer, cause the computer to perform the steps of:
   parsing the computer code;
   analyzing the contracts included in the parsed computer code;
   automatically combining information from the parsed code and information from analyzed contracts to create relevant inputs for unit test cases to cover different conditions that the contracts specify;
   executing the unit test cases with the generated relevant inputs;
   verifying proper functioning of the different conditions in the contracts; and
   suppressing expected errors based on the analyzed contract information.

22. The computer readable medium of claim 21, wherein the computer code comprises JAVA programming language.

23. The computer readable medium of claim 21, wherein the computer code comprises Java Server Pages programming language.

24. The computer readable medium of claim 21, wherein the computer code is source code.

* * * * *